United States Patent [19]
Huhn et al.

[11] Patent Number: 6,086,742
[45] Date of Patent: Jul. 11, 2000

[54] METHOD OF PRODUCING LAYERED MATERIAL FOR SLIDING BEARINGS AND AN ELECTROPLATING BATH FOR CARRYING OUT THIS METHOD

[75] Inventors: Hans-Ulrich Huhn, Schlangenbad-Wambach; Dietmar Wiebach; Klaus Müller, both of Wiesbaden, all of Germany

[73] Assignee: Glyco-Metall-Werke, Glyco B.V. & Co. KG, Wiesbaden

[21] Appl. No.: 09/125,835

[22] PCT Filed: Feb. 22, 1997

[86] PCT No.: PCT/DE97/00354

§ 371 Date: Aug. 21, 1998

§ 102(e) Date: Aug. 21, 1998

[87] PCT Pub. No.: WO97/31138

PCT Pub. Date: Aug. 28, 1997

[30] Foreign Application Priority Data

Feb. 24, 1996 [DE]  Germany ............................ 196 06 993

[51] Int. Cl.[7] .................... C25D 5/00; C25D 3/56; C25D 3/60; E04B 1/74; C23C 16/00
[52] U.S. Cl. ................. 205/171; 205/238; 205/253; 252/62.2; 106/1.23
[58] Field of Search ..................... 205/171, 238, 205/253; 252/62.2; 106/1.23

[56] References Cited

U.S. PATENT DOCUMENTS 3,226,308  12/1965  Pochapsky et al. ................. 204/26
4,363,854  12/1982  Hodes et al. ....................... 428/632

FOREIGN PATENT DOCUMENTS 048579  3/1982  European Pat. Off. .
577335  5/1946  United Kingdom .
679947  9/1952  United Kingdom .

OTHER PUBLICATIONS

Loshkarev et al., "Production of Antifriction Lead–Tin Coatings From a Fluoroborate Electrolyte With Additives", Vopr. Khim. Khim. Tekhnol., vol. 56, pp. 58–63. (abstract only), 1979 no month available.

Primary Examiner—Kathryn Gorgos
Assistant Examiner—Edna Wong
Attorney, Agent, or Firm—Reising, Ethington, Barnes, Kisselle, Learman & McCulloch, P.C.

[57] ABSTRACT

The invention concerns a method of producing layered materials for sliding bearings and an electroplating bath for carrying out this method. According to the method, an electroplating bath with a non-ionic wetting agent and a benzene derivative is used for depositing a binary layer on a bronze layer on which the lead- or tin-based binary layer and a molybdenum-based initial layer are deposited galvanically in succession. When the binary layer has been deposited and before the initial layer is deposited, at least one surface layer of the binary layer is anodically activated. The layered material comprises a steel support shell (1) and a cast leaded bronze (2) to which an intermediate layer (13) is applied galvanically. When the layer (3) has been applied galvanically, the surface region (5) is altered by anodic activation, whereupon the molybdenum oxide layer (4) is applied galvanically.

13 Claims, 3 Drawing Sheets

Fig. 4
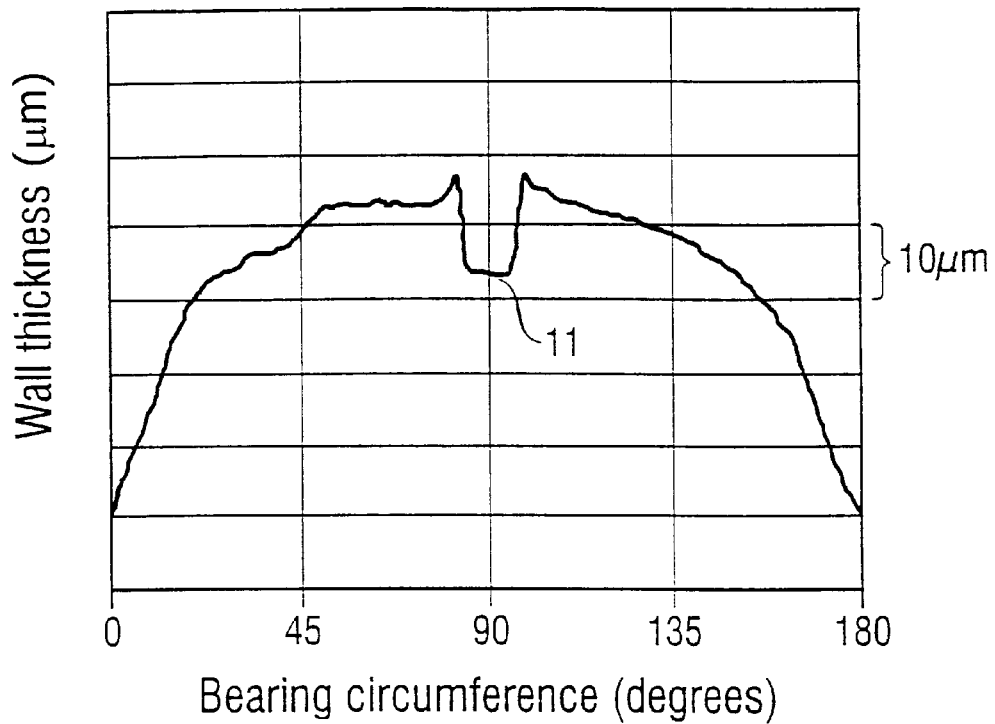
Wall thickness profile of bearing
*Prior Art*
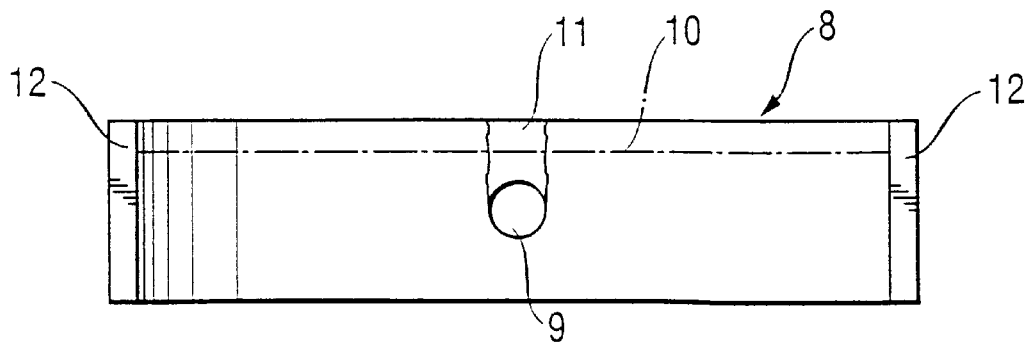
*Prior Art*   Fig. 3

METHOD OF PRODUCING LAYERED MATERIAL FOR SLIDING BEARINGS AND AN ELECTROPLATING BATH FOR CARRYING OUT THIS METHOD

This is a national stage application of PCT/DE97/00354, filed Feb. 22, 1997.

BACKGROUND OF THE INVENTION

1. Field of the Invention

The invention relates to a process for producing multi-layer material for plain bearings comprising a steel backing and a bronze layer, on which a lead- or tin-based binary layer and a molybdenum-based running-layer are deposited in succession by electroplating. The invention also relates to an electroplating bath for carrying out this process.

2. Description of the Related Art

The development of ever more powerful engines also increases the demands made of the bearings installed in these engines with regard to sustained load carrying capacity, wear resistance and corrosion protection.

Since a particularly significant aspect as far as these bearings are concerned is the improvement of conformation layers, which have to withstand an extremely high surface pressure, plain bearings have been developed which comprise a molybdenum-based running-in layer.

A sliding element is known from DE 29 26 708 A1, on the overlay of which there is provided a molybdenum oxide layer, which has a uniform, micro-flawed structure and is from 0.0005 to 0.003 mm thick. This molybdenum oxide layer is applied to a ternary overlay of PbSn10Cu2, for example. These known plain bearings are distinguished by low wear and enhanced corrosion resistance. However, these materials are not satisfactory if relatively high running speed stability and improved running-in behaviour are required.

Tests with binary overlays, such as PbCu3 for example, which fulfil these requirements somewhat better, have shown, however, that adhesion of the molybdenum oxide layer is unsatisfactory. It became evident that using conventional electrolytes resulted in streaked deposition of the PbCu layer after only a few production batches or a short service life. Light and dark areas were noted, the adhesion of the molybdenum oxide layer being extremely poor in the light areas. In contrast, adhesion in the dark areas of the binary layer was excellent. Furthermore, fluctuations in layer thickness of 12 $\mu$m or more were evident, which is unacceptable in the case of highly loadable bearings.

SUMMARY OF THE INVENTION

The object of the invention is therefore to provide a process and an electroplating bath with which the adhesion of molybdenum oxide layers to binary overlays is improved.

This object is achieved using a process in which, for deposition of the binary layer, an electroplating bath is used which comprises a non-ionic wetting agent and a benzene derivative and in which, after deposition of the binary layer and prior to deposition of the running-in layer, anodic activation of at least one surface layer of the binary layer is effected.

PbCu layers with copper contents of from 1 to 10%, PbSn layers with tin contents of from 10 to 30% and tin-antimony layers with antimony contents of from 1 to 10% a are particularly suitable for use as binary layers.

First of all, it was attempted, with the aid of a PbCu electrolyte, to improve the stability of the electroplating bath by adding organic components. If the PbCu electrolyte is operated without organic components, the deposits obtained are thoroughly non-uniform and uncontrolled. In the low current density range copper is preferentially deposited. At higher current densities separate deposition of PbCu and Pb phases occurs. The addition of benzene derivatives, especially resorcinol, in an amount of up to 10 g/l, succeeded in modifying this deposition behaviour only insignificantly. Non-ionic wetting agents were then tried, these being added in amounts of up to 10 mg/l. It was noted that, although these non-ionic wetting agents increasingly inhibit copper deposition, the deposition behaviour from the point of view of dispersion and layer thickness profile remained unsatisfactory. Thus, for example, it was noted that the layer reduced considerably at oil-holes.

It has surprisingly emerged that it is by combining non-ionic wetting agents and benzene derivatives that a clear improvement may be obtained. However, the synergistic action of the two organic components appeared only at relatively high concentrations. The proportion of non-ionic wetting agent should preferably range from 15 to 30 mg/l and that of the benzene derivative should preferably range from 10 to 20 g/l. It was thereby possible to improve both dispersion and deposition up to a current density range of 2 A/dm$^2$.

However, this improvement in deposition behaviour was accompanied by a deterioration in the adhesion of the molybdenum oxide layer. Even the dark PbCu phases merged increasingly with the light PbCu phase, resulting in finely crystalline deposition in the low current density range. The molybdenum oxide layer applied no longer exhibited any adhesion at all.

This disadvantage could be only be rectified by anodically activating the binary layer. For this purpose, the current direction was reversed, such that the plain bearing was connected not as the cathode but as the anode. This reversal resulted in an attack on the previously deposited PbCu layer.

Tests carried out on a test sheet showed that the PbCu layer treated in this way was dyed during the electroplating process, the colour thereof ranging, depending on the current density, from deep black (high current density) through brown to grey-brown (low current density). In the case of high current densities, at which the dark PbCu phase was deposited, the surface took on a velvety appearance. The layer could be partially wiped away, leaving the colouring behind. The molybdenum oxide layer applied no longer exhibited any adhesion at all. In the case of middle and low current densities, on the other hand, excellent adhesion of the molybdenum oxide layer could be observed.

Obviously, the short-term anodic oxidation results in activation of the light PbCu phase which is sufficient to achieve adhesive application of the subsequent molybdenum oxide layer. It may be presumed that anodic oxidation forms a layer of an oxidic nature on the lead-copper overlay, to which layer the molybdenum oxide layer then adheres well.

A fatty acid glycol ester is preferably used as the non-ionic wetting agent, resorcinol preferably being used as the benzene derivative. It has been shown that, in addition, boric acid also has a stabilising effect on the electroplating bath. The addition of boric acid must be effected in such a way that the electroplating bath becomes saturated.

A preferred electroplating bath for the deposition of a PbCu layer exhibits the following composition:

| | |
|---|---|
| fatty acid glycol ester | 15–30 mg/l |
| resorcinol | 10–20 g/l |
| copper | 1–10 g/l |
| lead | 90–110 g/l |
| $HBF_4$ | 30–45 g/l | and boric acid to saturate the bath.

The temperature of the electroplating bath should be adjusted to between 20 and 30° C.

It has been shown that, to achieve anodic activation of the binary layer, the current in the electroplating bath need undergo pole reversal for only 10–60 sec. The current density is preferably adjusted to between 1 and 4 $A/dm^2$, advantageously 2.5 $A/dm^2$. Electrodeposition of the binary layer is best carried out with current densities ranging from 1 to 3 $A/dm^2$.

The electroplating bath according to the invention for the deposition of binary layers comprises a non-ionic wetting agent and a benzene derivative.

BRIEF DESCRIPTION OF THE DRAWINGS

Exemplary embodiments are described in more detail below with the aid of the drawings, in which:

FIG. 3 is a plan view of a bearing shell with a coating according to the prior art, FIG. 4 shows the wall thickness profile for the bearing shell shown in FIG. 3

DETAILED DESCRIPTION OF THE PREFERRED EMBODIMENTS

Figure 1:
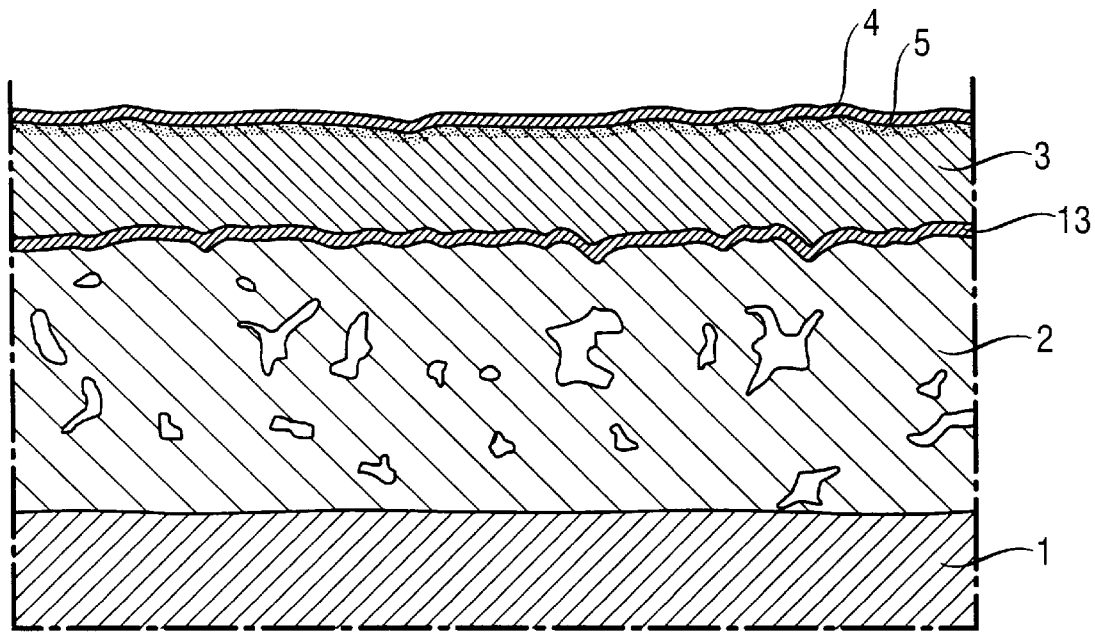
FIG. 1 shows a section through the material according to the invention.

FIG. 1 illustrates the multilayer material according to the invention. A steel backing shell 1 has a cast lead-bronze 2 applied to it, to which there have in turn been applied by electroplating an intermediate layer 13 of Ni or Ni/NiSn and a PbCu3 layer 3. The composition of the bath and the current densities used were as follows:

copper 2.8 g/l
lead 100 g/l
$HBF_4$ 40 g/l
fatty acid glycol ester 20 mg/l
resorcinol 13 g/l
saturated with boric acid
bath temperature: room temperature
current density 2 $A/dm^2$.

After electrodeposition of the layer 3, anodic activation was carried out. For this purpose, the current direction was reversed in the electroplating bath for 20 sec, a current density of 2.5 $A/dm^2$ being used. The modification of the surface area, in which the anodic activation brings about the lead oxide layer, is indicated by the layer 5.

After anodic activation, the molybdenum oxide layer 4 was likewise applied by electroplating, and adhered fully to the lead-copper layer 3.

Figure 2:
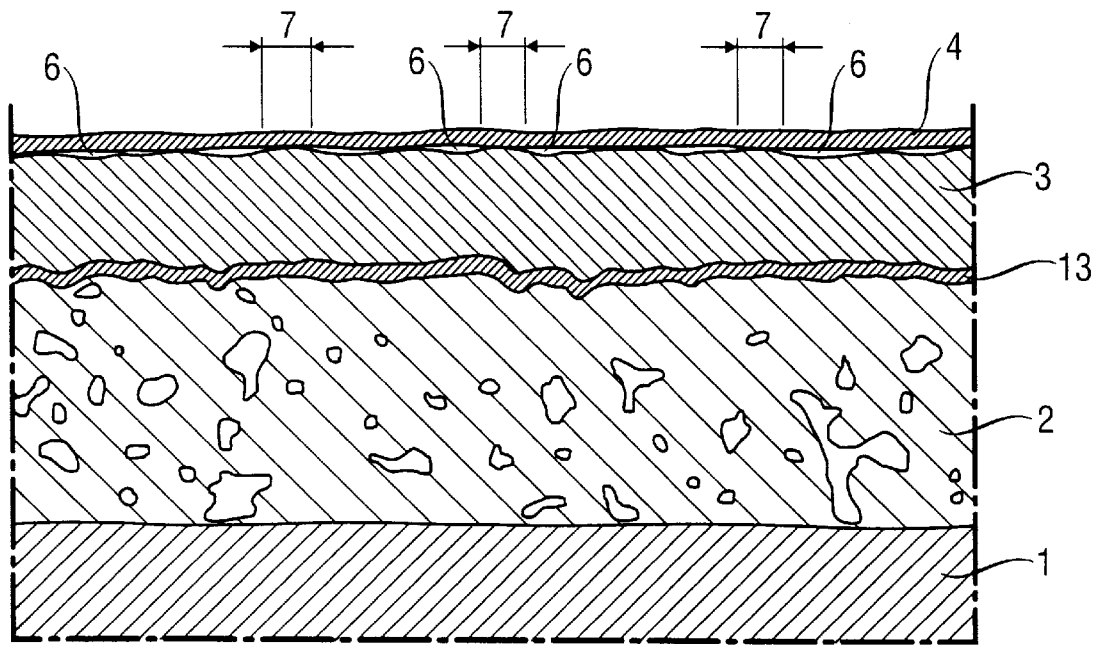
FIG. 2 shows a section through a material according to the prior art.

For comparison, a multilayer material according to the prior art is shown in FIG. 2. The layered structure corresponds to that of FIG. 1 as far as layers 1, 2 and 3 are concerned, the PbCu3 layer being produced by a conventional electroplating bath without organic additives. The molybdenum oxide layer applied adheres only in the areas provided with the reference numeral 7. In the areas therebetween voids 6 may be noted, where the layer 4 exhibits absolutely no adhesion. The streaks 7 of the lead-copper layer are dark in colour, while the areas therebetween, where the molybdenum oxide layer has not bonded with the copper-lead layer, are light in colour.

FIG. 3 is a plan view of a bearing shell 8. The two partial surfaces 12 are visible, as is an oil-hole 9 in the overlay, said oil-hole 9 laterally comprising an area 11 in which the layer thickness is reduced. The path along which the layer thickness profile was measured, is provided with the reference numeral 10.

This bearing shell 8 comprises a PbCu3 overlay, which was deposited in the following electroplating bath:

copper 3.4 g/l
lead 90 g/l
$HBF_4$ 40 g/l
fatty acid glycol ester 3.5 mg/l
resorcinol 4.5 g/l
no boric acid
temperature of electroplating bath: room temperature.

The result of the measurement of the wall thickness profile is shown in FIG. 4. The point at which the wall thickness profile exhibits a dent is likewise provided with the reference numeral 11, in order to establish the relationship between it and the corresponding area in FIG. 3.

Figure 5:
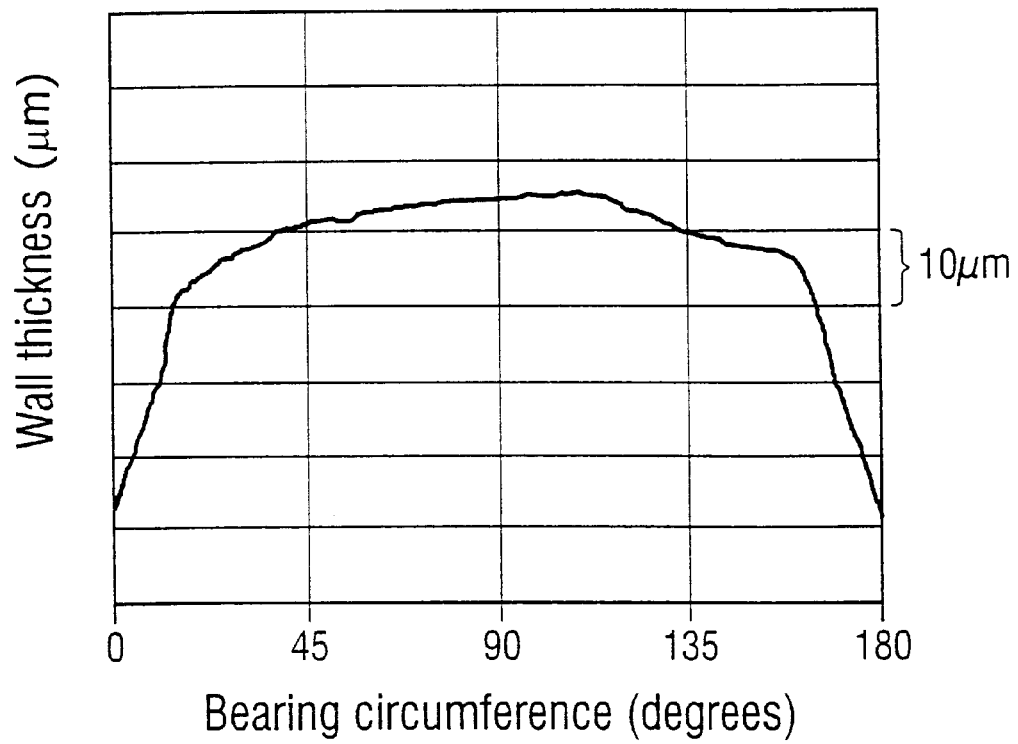
FIG. 5 shows the wall thickness profile in the case of a bearing shell produced by the process according to the invention.

FIG. 5 shows the wall thickness profile for a bearing shell produced by the process according to the invention. Once again, a PbCu3 layer was provided, but it was produced using an electroplating bath like the one used for the multilayer material according to FIG. 1. It is clear that the wall thickness profile does not exhibit any irregularities.

Obviously, many modifications and variations of the present invention are possible in the light of the above teachings. It is, therefore, to be understood that within the scope of the appended claims, the invention may be practiced otherwise than as specifically described.

What is claimed is:

1. A process for producing multilayer materials for plain bearings comprising:
    preparing a metallic backing layer;
    applying a bronze layer to the backing layer;
    electrodepositing a binary layer on the bronze layer selected from a group of materials consisting essentially of lead-based and tin-based alloys in an electroplating bath having a non-ionic wetting agent and a benzene derivative;
    anodically activating at least one surface layer of the binary layer; and
    electroplating a molybdenum-based running-in layer on the binary layer.

2. The process of claim 1 including providing the bath with a concentration of 15–30 mg/l of the non-ionic wetting agent and 10–20 g/l of the benzene derivative.

3. The process of claim 2 including selecting a fatty acid glycol ester as the non-ionic wetting agent and selecting resorcinol as the benzene derivative.

4. The process of claim 1 including adding boric acid to the electroplating bath in an amount to saturate the bath with the boric acid.

5. The process of claim 1 wherein the binary layer comprises a lead-copper binary layer deposited in a bath having the following composition:

|                        |            |
|------------------------|------------|
| fatty acid glycol ester | 15–30 mg/l |
| resorcinol             | 10–20 g/l  |
| copper                 | 1–10 g/l   |
| lead                   | 90–110 g/l |
| HBF$_4$                | 30–45 g/l  | boric acid in an amount to saturate the bath.

6. The process of claim 1 including maintaining the temperature of the bath between 20–30° C.

7. The process of claim 1 wherein the anodic activation of the binary layer is achieved by reversing the polarity in the bath for a period of about 10 to 60 seconds.

8. The process of claim 7 wherein the polarity is reversed for about 20 seconds.

9. The process of claim 7 including adjusting current density of the bath during pole reversal to about 1 to 4 A/dm$^2$.

10. The process of claim 9 wherein the current density is adjusted to about 2.5 A/dm$^2$.

11. The process of claim 1 wherein during deposition of the binary layer, maintaining current density of the bath between 1 to 3 A/dm$^2$.

12. An electroplating bath for the deposition of binary layers in a multilayer material for sliding elements comprising a plating solution including a non-ionic wetting agent present at a concentration of 15–30 mg/l and a benzene derivative present at a concentration of 10–20 g/l and wherein said non-ionic wetting agent comprises a fatty acid glycol ester and said benzene derivative comprises resorcinol.

13. The electroplating bath of claim 12 wherein said bath further includes:

|         |            |
|---------|------------|
| copper  | 1–10 g/l   |
| lead    | 90–110 g/l |
| HBF$_4$ | 30–45 g/l  | boric acid in an amount to saturate the bath.

* * * * *